US010486585B2

(12) United States Patent
Hansmann et al.

(10) Patent No.: US 10,486,585 B2
(45) Date of Patent: Nov. 26, 2019

(54) CLOSURE SYSTEM FOR CLOSING AN OPENING OF A VEHICLE LIGHT AND VEHICLE LIGHT

(71) Applicants: ITW FASTENER PRODUCTS GmbH, Iserlohn (DE); Hella KGaA Hueck & Co., Lippstadt (DE)

(72) Inventors: Frank Hansmann, Lipperbruch (DE); Martin Zajak, Kaiserslautern (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 14/414,438

(22) PCT Filed: Jul. 11, 2013

(86) PCT No.: PCT/EP2013/002054
§ 371 (c)(1),
(2) Date: Jan. 12, 2015

(87) PCT Pub. No.: WO2014/009017
PCT Pub. Date: Jan. 16, 2014

(65) Prior Publication Data
US 2015/0307017 A1 Oct. 29, 2015

(30) Foreign Application Priority Data

Jul. 12, 2012 (DE) .................. 10 2012 106 293

(51) Int. Cl.
*B60Q 1/00* (2006.01)
*F21S 45/50* (2018.01)
(Continued)

(52) U.S. Cl.
CPC .............. *B60Q 1/007* (2013.01); *F21S 45/10* (2018.01); *F21S 45/50* (2018.01); *F21V 15/01* (2013.01); *F21V 31/005* (2013.01)

(58) Field of Classification Search
CPC . B60Q 1/007; F21S 48/33; F21S 45/50; F21S 45/10; F21V 31/005; F21V 41/194; F21V 15/01
(Continued)

(56) References Cited

U.S. PATENT DOCUMENTS 3,558,872 A * 1/1971 Hough .................. B60Q 1/007
362/549
3,688,103 A * 8/1972 Daumuller ............ F21S 41/196
362/523
(Continued)

FOREIGN PATENT DOCUMENTS

CN       201951338 U    8/2011
DE       195 15 207 A1  11/1995
(Continued)

OTHER PUBLICATIONS

Chinese Office Action dated Feb. 29, 2016 (in English language) for corresponding China Application No. 201380036535.8.
(Continued)

*Primary Examiner* — Erin Kryukova
(74) *Attorney, Agent, or Firm* — Intellectual Property Law Group LLP

(57) ABSTRACT

The invention relates to a closure system (1) for closing an opening (20) of a vehicle light, having a closure element (10) and an opening (20) of a vehicle light, wherein the opening (20) has an edge (21), the edge (21) of the opening (20) being in particular conical or at least substantially conical in shape. The invention further relates to a vehicle light having such a closure system (1).

20 Claims, 2 Drawing Sheets

(51) Int. Cl.
  *F21V 31/00* (2006.01)
  *F21S 45/10* (2018.01)
  *F21V 15/01* (2006.01)

(58) Field of Classification Search
  USPC .............................. 362/374, 375; 49/40, 465
  See application file for complete search history.

(56) References Cited

U.S. PATENT DOCUMENTS

| | | | | | |
|---|---|---|---|---|---|
| 4,387,740 | A | * | 6/1983 | Vanzant | F16J 13/10 138/89 |
| 4,528,619 | A | * | 7/1985 | Dolan | F21S 41/198 362/519 |
| 4,569,006 | A | * | 2/1986 | Bergin | F21S 41/194 362/549 |
| 4,795,388 | A | * | 1/1989 | Coliandris | H01K 1/46 445/22 |
| 5,072,348 | A | * | 12/1991 | Tsukada | B60Q 1/007 362/549 |
| 5,188,444 | A | * | 2/1993 | Makita | B60Q 1/0041 362/265 |
| 5,239,226 | A | * | 8/1993 | Seredich | F21S 41/192 313/318.01 |
| 5,562,339 | A | * | 10/1996 | Tanaka | B60Q 1/007 362/265 |
| 6,450,670 | B1 | * | 9/2002 | Strauss | F21S 48/325 362/264 |
| 7,390,043 | B2 | * | 6/2008 | Kraus | B62D 25/24 215/355 |
| 7,784,150 | B2 | * | 8/2010 | Anderson | B61D 3/18 105/355 |
| 7,909,495 | B2 | | 3/2011 | Yashiki | |
| 8,845,126 | B1 | * | 9/2014 | Martzall | F21S 8/022 362/183 |
| 2005/0205576 | A1 | * | 9/2005 | Bednara | H05K 5/061 220/328 |
| 2008/0196316 | A1 | * | 8/2008 | Choi | E02D 29/1427 49/465 |
| 2008/0266892 | A1 | * | 10/2008 | Yashiki | B60Q 1/0094 362/546 |
| 2013/0205674 | A1 | * | 8/2013 | Damon | E05B 65/006 49/465 |
| 2015/0202949 | A1 | * | 7/2015 | Ogino | B60J 5/0418 49/465 |
| 2017/0299150 | A1 | * | 10/2017 | Maglica | F21V 13/045 |

FOREIGN PATENT DOCUMENTS

| | | | |
|---|---|---|---|
| DE | 197 37 989 A1 | 3/1998 | |
| DE | 10 2008 062 638 A1 | 9/2009 | |
| EP | 0 676 583 A1 | 10/1995 | |
| EP | 0676583 A1 * | 10/1995 | ............. B60Q 1/007 |
| WO | WO 2008 009 008 A2 | 1/2008 | |
| WO | WO 2010 053 458 A1 | 5/2010 | |

OTHER PUBLICATIONS

International Search Report, dated Sep. 10, 2013 for corresponding International Application No. PCT/EP2013/002054 with English translation.

* cited by examiner

CLOSURE SYSTEM FOR CLOSING AN OPENING OF A VEHICLE LIGHT AND VEHICLE LIGHT

CROSS-REFERENCE TO RELATED APPLICATIONS

This application is a U.S. National Phase application, under 35 U.S.C. § 371, of International Application no. PCT/EP2013/002054, with an international filing date of Jul. 11, 2013, and claims benefit of German Application no. 10 2012 106 293.5 filed on Jul. 12, 2012, which are hereby incorporated by reference for all purposes.

BACKGROUND OF THE INVENTION

1. Field of the Invention

The present invention relates to a closure system for closing of an opening of a vehicle light and a vehicle light.

2. Background Art

It is basically known to equip vehicle lights with an opening, which are lockable by a closure system with the closure element. Through such openings for example maintenance work at the vehicle light can be performed, like for example the replacement of an illuminant of the vehicle lights. The closure elements which are intended to close the respective opening can thereby conduct various functions. For example such closure elements can comprise electric currents for the operation of the illuminant, like for example disclosed in DE 195 15 207 C2 or in U.S. Pat. No. 7,909,495 B2. Likewise, the configuration of a closure element by which the closure element is intended through the electronic housing, which is intended for the acceptance of the entire electric components of the vehicle light, is known according to DE 197 37 989 A1. Likewise such a closure element can provide a pressure compensation membrane (DE 10 2008 062 638 A1). Thereby by a vehicle light, which is provided with such a closure element, a pressure compensation between the inside of the vehicle light and the surrounding is enabled.

Known closure systems and particularly the their closure elements for closing of an opening of a vehicle light process the disadvantage, that the closure of an opening of the vehicle light with such a closure element or such a closure system can often be conducted particularly manual. This can particularly originate by the fact, that with known closure elements and closure systems high requirements are requested concerning the opposing relative positioning of closure element and vehicle lights. An automatic or mechanical closure of a vehicle light with a closure element is thereby not possible or is at least complicated.

SUMMARY OF THE INVENTION

It is the object of the present invention to at least partially resolve the previously described disadvantages of known closure elements. Particularly it is the object of the present invention to provide a closure element, a closure system and a vehicle light, which enable an automatic and particularly mechanical closure of an opening of the vehicle in a cost-efficient and simple way.

The above-mentioned objection is solved by a closure system for closing an opening of a vehicle light with the features of the independent claim 1 and by a vehicle light with the features of claim 10. Further features and details of the invention result from the dependent claims, the description and the drawings. Thereby, features and details, which are described in combination with the closure system according to the invention apply naturally also in connection with the vehicle light according to the invention and vice versa, so that according to the disclosure of the single aspects of the invention it is or it can be always reciprocally referred to.

According to a first aspect of the invention the object is solved by a closure system for closing of an opening of the vehicle light, comprising a closure element and an opening of a vehicle light, wherein the opening comprises an edge. Particularly a closure element according to the invention is characterized in that the edge of the opening is tapered or at least mainly tapered.

A vehicle light according to the invention can thereby particularly be a headlight of a vehicle. Naturally also other vehicle lights like for example a fog light or a break or backlight of a vehicle are lockable with the closure system according to the invention. Likewise the closure of openings in other hollow components with a closure system according to the invention is of course possible. An opening in a vehicle light particularly permits an access to the inside of the vehicle light. Thereby it is possible to perform maintenance at the vehicle light, like for example an exchange of an illuminant of the vehicle light. An absolute cylindrical edge of the opening would only enable a radial closure of the opening, an exclusively plane shape of the edge would only enable an axial closure of the opening. By a tapered or at least mainly tapered shape of the edge of the opening of the closure system according to the invention it is possible to enable a closure of the opening in radial and also in axial direction. Such a closure system thereby comprises an opening, which can be closed particularly well by the closure element. Particularly the advantage arises of a so-called self-centering of the closure element during the closure of the opening. By the tapered or at least mainly tapered shape the closure element is brought in an ideal position for closing the opening during the closure of the opening through the contact of the closure element with the edge of the opening. The requirements, which are raised to the relative position of the closure element for opening, are thereby diminished. For example with the system according to the invention, by which the edge of the opening is tapered or at least mainly tapered, the opening and the closure elements can be inclined up to ±30° towards one another at the beginning of the closing operation, without influencing the closing operation. This represents the major advantage during the assembly of the vehicle light, which is equipped with such a closure system according to the invention, whereby in turn cost advantage is achieved. Another advantage resides from a tapered or at least mainly tapered shape of the edge of the opening during the production of such an edge. At the edge of an opening, which is particularly produced by injection molding, it is possible by the shape of the edge according to the invention, to detract a molding tool in the direction away from the edge used for the formation of the edge, which differs up to 30° from the main formation direction of the molding tool, particularly without damaging the edge or the functional surface of the edge. This represents a huge simplification to the requirements during the formation of such a molding tool, whereby in turn cost savings can be achieved.

Moreover, it can be intended by a closure system according to the invention, that sections of the closure element facing the edge of the opening are tapered or at least mainly tapered. Thereby it is possible to further reduce the requirements to the accuracy of the positioning of the closure element regarding the opening of the vehicle lights, which should be closed by the closure elements. For example a cylindrical closure element for closing a cylindrical opening of the vehicle light had to be positioned noticeably more precise regarding the to be closed opening, like it is necessary with a tapered or mainly tapered closure element. By a tapered or mainly tapered shape further the self-centering of the closure element during the closing operation can be increased.

According to the invention it can be intended with a closure system that the closure system for closing and opening of a vehicle light is shaped with an acceptance for a tool, wherein by using the tool the opening of the vehicle light is lockable with the closure element. The utilization of a tool permits particularly a mechanical and/or automatic closure of an opening of a vehicle light with a closure system according to the invention. An exclusively manual closure of the opening can thereby be avoided. Particularly by a mechanical closure of an opening of a vehicle light by a closure system according to the invention, which is enabled by the existence of an acceptance for a tool, a faster closure of the opening of the vehicle light can be achieved. This is particularly an advantage during the production and/or assembly of the vehicle light, which is equipped with such a closure system. Moreover, it can be an advantage by a mechanic and/or automatic closure of an opening of a vehicle light by closure system according to the invention, that the machine used for closing the opening of the vehicle light, which is particularly equipped with the appropriate tool, greater forces compared to absolutely manual actuation of the closure element can be applied. Thereby an increase of the safety of closing an opening of a vehicle light can be achieved by a closure system according to the invention. By an automatic closure of an opening of a vehicle light by a closure system according to the invention, like it is possible by an acceptance for a tool at the closure element, costs can be saved, particularly during the production of a vehicle light.

A closure system according to the invention can be further developed in a way that the acceptance is shaped for the actuation of a tool shaped as an open-end wrench and/or hexagon socket wrench. An open-end wrench or a hexagon socket wrench are thereby particularly established tools. Naturally, the acceptance can also be shaped for the application of other established tools. By such a shape of the acceptance complex new developments regarding the utilized tool can be avoided. Already existing tools can be applied and that thereby costs can be saved. A great freedom of scope during a construction of an acceptance of the closure system according to the invention is thereby given.

Particularly preferred it can be intended by a closure system according to the invention, that the closure element comprises a particularly revolving sealing element. It is possible by such a sealing element to seal the inside of the vehicle light which is closed by a closure system according to the invention. Thereby particularly a revolving sealing element is of advantage, since thereby the opening can be particularly completely sealed. Particularly the sealing element can be part of the tapered or at least mainly tapered shape of the closure element. By such a shape for example a simultaneously radial and axial seal of the opening of the vehicle light is possible. An opening of the vehicle light, which is closed with such a closure system, is thereby particularly well sealed against the surroundings. Such a seal can protect the inside of the vehicle light particularly against the penetration of moisture. A vehicle light shaped with such a closure element according to the invention, is there by protected against damage of penetrating moisture and thereby comprises an extended lifespan.

It can be preferably intended with closure system according to the invention that at the edge of the opening a particularly revolving sealing element is intended. All advantages, which are described regarding a closure system according to the invention with a sealing element at the closure element, naturally apply also for closure system by which a particularly revolving sealing element is intended and the edge of the opening. Thereby the sealing element can particularly be part of the tapered or at least mainly tapered shape of the edge of the opening. Particularly sealing elements can be naturally intended at the closure element and at the edge of the opening.

It can particularly be intended by a closure system according to the invention, that the opening is radially and axially sealed via the sealing element. By sealing in radial and axial direction a particularly well sealing of the interior of the vehicle light is yielded, which is equipped with closure system according to the invention. Such a sealing in radial and axial direction can for example be achieved by a tapered or mainly tapered shape of the edge of the opening and parts of the closure element facing the edge of the opening.

It is particularly intended with closure system according to the invention, that the closure element can be attached in and/or at the opening, particularly at the edge of the opening, in a force- and/or form-fitting way. Thereby, it can be particularly intended, that the closure element can be shaped in a detachable connection. By such an attachment an undesired opening of the opening, which is closed by a closure element according to the invention, is reliably prohibited.

Moreover, it can particularly be intended in a closure system according to the invention, that at the closure element and at the opening, particularly at the edge of the opening, corresponding parts of the bayonet lock are assembled. A bayonet lock thereby represents a particularly simple closure which at the same time provides a high closure safety. Particularly with closure system according to the invention it can be intended, that the necessary counter force for the bayonet lock can be provided by a particularly resilient sealing element. Additional components which provide the counterforce with known bayonet locks can thereby be saved. Such a bayonet lock thereby comprises a particularly simple and cost-efficient way to fix a closure element of a closure system according to the invention in or at the opening.

In the second aspect of the invention the object is solved by a vehicle light comprising a closure system for closing an opening of a vehicle light. Particularly a vehicle light according to the invention is characterized in that the closure system is provided according to a first aspect of the invention. All advantages which are described in connection with the closure system according to the first aspect of the invention reside naturally also for the vehicle light, which comprises such closure system according to the invention according to the first aspect of the invention.

BRIEF DESCRIPTION OF THE DRAWINGS

The present invention is described in more detail by means of the enclosed drawings. It is schematically shown.

DETAILED DESCRIPTION OF SPECIFIC EMBODIMENTS

Figure 1:
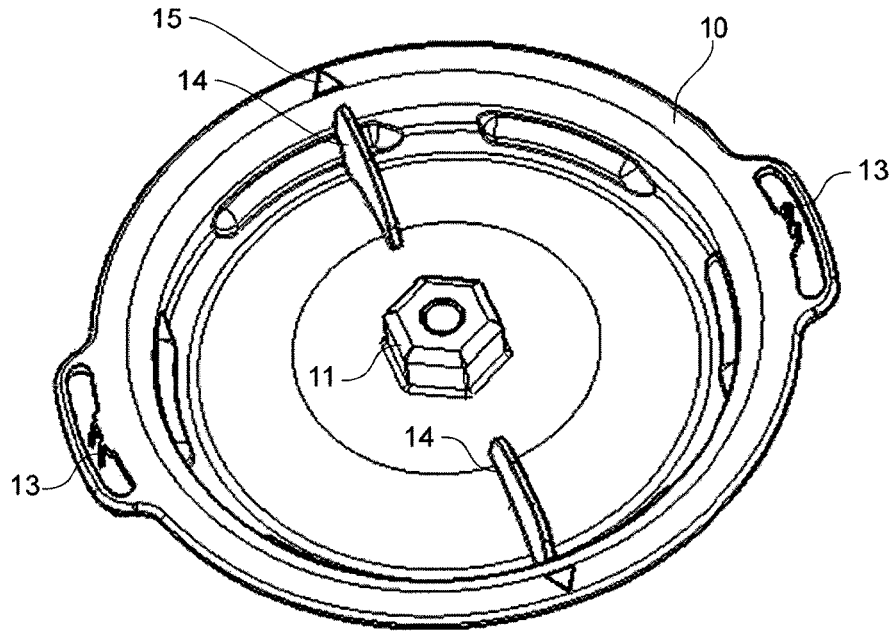
FIG. 1 a form of closure element of a closure system according to the invention, FIG. 2 the form of the closure system according to the invention, FIG. 3 a partially sectional view of a closure system according to the invention before closing of the opening and FIG. 4 a partially sectional view of the closure system according to the invention after clothing the opening.

FIG. 1 shows a closure element 10 according to the invention in the first form. It is clearly visible, that the closure element 10 according to the invention comprises an acceptance 11 assembled in the center, which is shaped as a hexagonal nut in the present form. Thereby it is possible to fix a closure element 10 according to the invention in an opening 20 (not shown) of a vehicle light with the common tool 30 (not shown). For a secure assembly of the closure element 10 at the vehicle light parts of a bayonet lock 13 are assembled at the edge of the closure element 10. Moreover the closure element 10 comprises handles 14, through which, when necessary, also a manual actuation of the closure element 10 is possible. Further the closure element 10 according to the invention comprises position indicators 15 in the show form, which in the assembled condition register the position of the closure element 10 relative to the opening 20.

Figure 2:
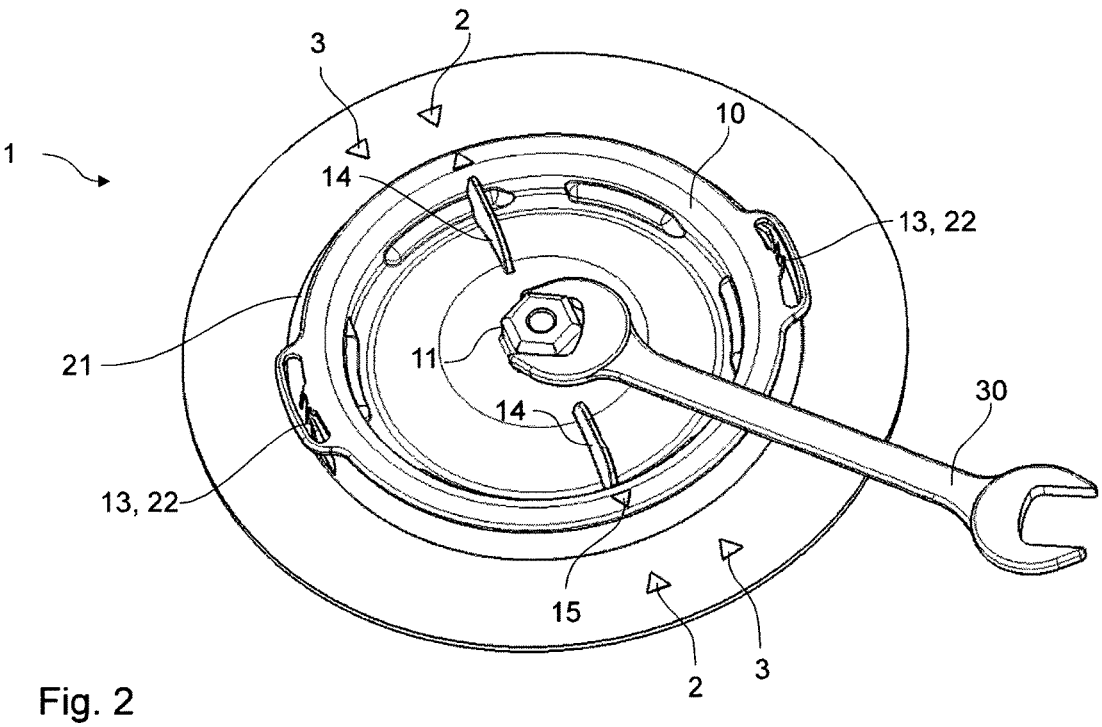

In FIG. 2 a closure system 1 according to the invention is shown, by which a closure element 10 is already inserted in opening 20 (not shown) of a vehicle light. The closure element 10 is thereby in contact particularly with the edge 21 of the opening 20. For assembly of the closure element 10 in the opening 20 parts 13, 21 of a bayonet lock are assembled at the closure element 10 and at the border strip 21. The closure system 1 in its shown form is in its first position 2, in which the bayonet lock 13, 22 is not yet secured. This is shown by the position indicator 15, which is assembled at the closure element 10. Through a rotation of the closure element 10 from its first position 2 to its second position 3 the bayonet lock 13, 22 is secured. This can particularly happen through a tool 30, which affects the acceptance 11 at the closure element 10. The tool 30 is shown as an open-end wrench. Naturally also other tools 30 are possible, whereby particularly the closure of the opening 20 of the vehicle light with the closure element 10 can occur also mechanically and/or automatically. Particularly the shown closure element 10 is provided with a sealing element 12 (not shown) at the side facing the edge 21. This enables on the one hand a secure sealing of the interior of the vehicle light. Moreover, also the necessary counter force for the bayonet lock 13, 22 can be generated by the sealing element 12, which is particularly resilient.

Figure 3:
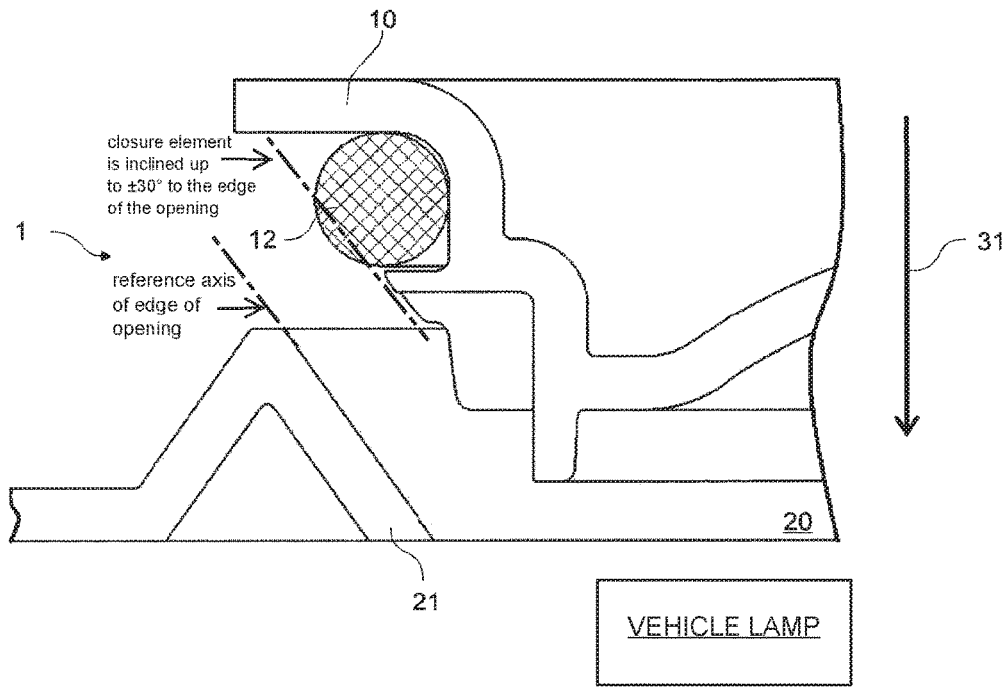
Figure 4:
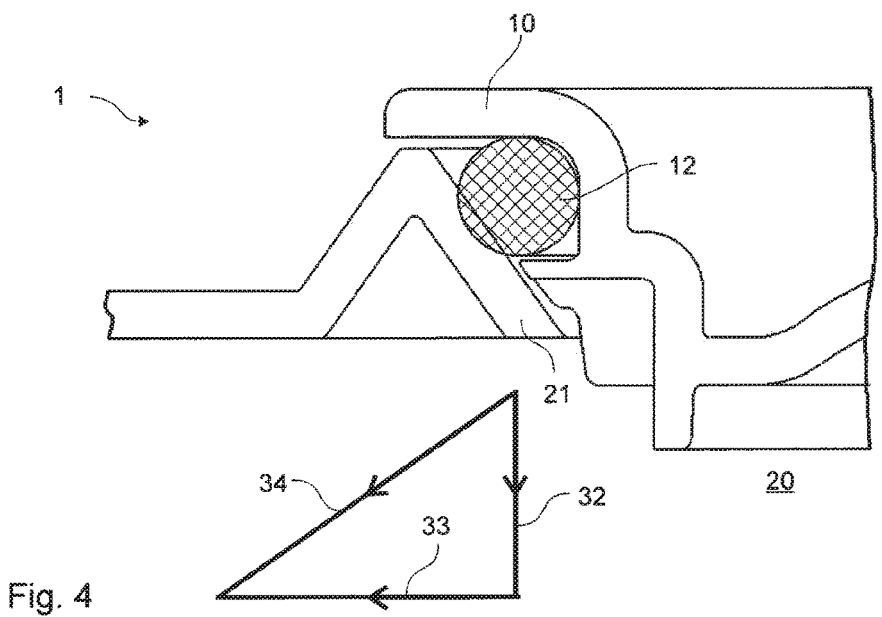

In FIG. 3 and FIG. 4 a closing operation of the closure system 1 according to the invention is schematically shown. In FIG. 3 the closure element 10 moves towards the opening 20 in axial mounting direction 31. The opening 20 is thereby limited by a border 21, which is particularly tapered. Likewise the parts of the closure element 10 facing the border 21 are mainly tapered, wherein particularly also the sealing element 12 is assembled in this section of the closure element 10 and represents a part of the tapered shape. In FIG. 4 a closed closure system 1 is shown. The forces, which thereby particularly affect the sealing element 12 are shown in a separate triangle of forces. Thereby the entire force 34 which affects the sealing element 12 is divided in an axial force component 32 and radial force component 33. Particularly in the axial force component 32 is thereby used as counterforce during the locking of the bayonet lock 13, 22 (not shown). The shown triangle of forces thereby represents a balanced thereby ideal balance of forces, since the entire force 32 is particularly orientated vertical towards the tapered edge 21 of the opening 20. In this case, that the closure element 10 is inclined towards the edge 21 of the opening 20, a triangle of forces resides, which is this displaced regarding this balance of forces. Thereby a self-centering is produced, since only the shown balance of forces shows the steady state. It this thereby particularly possible that the closure element 10 is inclined up to ±30° towards the edge 21 of the opening 20 at the beginning of the closure procedure, without preventing a closure of the opening 20. Thereby likewise an automatic or mechanical closure of the opening 20 is simplified by a closure system according to the invention. The requirements for positioning of the single parts of the closure system 1, particularly the relative positioning of the closure element 10 regarding the opening 20 is thereby diminished. A particularly simple closure is thereby enabled, which can particularly also occur mechanical and automatic.

REFERENCE NUMERAL LIST 1 closure system
2 first position
3 second position
10 closure element
11 acceptance
12 sealing element
13 part of a bayonet lock
14 handle
15 position indicator
20 opening
21 edge
22 part of a bayonet lock
30 tool
31 axial mounting direction
32 axial force component
33 radial force component
34 entire force

What is claimed is:

1. A closure system (1) for closing an opening (20) of a vehicle light, comprising a vehicle light closure element (10) and an opening (20) of a vehicle light, wherein the opening (20) comprises an edge (21), characterized in that, the edge (21) of the opening (20) is tapered, and the closure element comprises a side groove having a horizontal ledge forming an inner bottom surface of the groove, wherein the bottom surface is closer in distance to the vehicle light than a top surface of the closure element, the bottom surface of the groove faces an upper surface of the groove, and a vertical wall connecting the opposed upper and bottom surfaces of the groove, wherein said upper surface of the groove extends above an uppermost top surface of the opening;

a perimeter edge of the closure element (10) located beneath the groove and facing the edge (21) of the opening, beginning from an outermost point of the horizontal ledge, tapers to match an incline of the edge (21) and configured to align with the incline of the edge (21) in a closed position, wherein the taper of the perimeter edge of the closure element produces a self-centering of the closure element during a closing operation in that the closure element is inclined up to ±30° with respect to a reference axis aligned with the edge of the opening at a beginning of the closing operation without preventing a closure of the opening;

the edge of the opening begins from the uppermost top surface of the opening, the incline of the edge of the opening tapers consistently from the uppermost top surface and aligns with the perimeter edge of the closure element in the closed position, such that the edge of the opening forms a conical shape;

wherein the closure element (10) comprises an acceptance (11) assembled on the top surface of the closure element facing away from the vehicle light and in an axial center of the closure system which is shaped as a hexagonal nut;

wherein the closure element (10) is shaped at least in or at the edge (21) of the opening (20), wherein the closure element (10) is at least force- or form-fittingly attachable to the opening (20).

2. The closure system (1) according to claim 1, characterized in that,
the perimeter edge of the closure element (10) that is beneath the groove and facing the edge (21) of the opening (20) tapers toward the axial center.

3. The closure system (1) according to claim 1, characterized in that,
at the closure element (10) the acceptance (11) is intended for actuation by a tool (30),
wherein by utilization of the tool (30) the opening (20) of the vehicle light is lockable with the closure element (10).

4. The closure system (1) according to claim 3, characterized in that,
the acceptance (11) is shaped for actuation by a tool (30) shaped as an open-end wrench or a hexagon socket wrench.

5. The closure system (1) according to claim 1, characterized in that,
the closure element (10) comprises a revolving sealing element (12).

6. The closure system (1) according to claim 1, characterized in that,
the edge (21) of the opening (20) intends a revolving sealing element (12).

7. The closure system (1) according to claim 5, characterized in that,
through the sealing element (12) the opening (20) is radially and axially sealable.

8. The closure system (1) according to claim 1, characterized in that,
at the closure element (10) and at the edge (21) of the opening (20), corresponding parts (13, 22) of a bayonet lock are assembled.

9. A vehicle light, comprising a closure system (1) for closing of an opening (20) of the vehicle light, characterized in that,
the closure system (1) is established according to claim 1.

10. The closure system (1) according to claim 2, characterized in that,
at the closure element (10) the acceptance (11) is intended for actuation by a tool (30),
wherein by utilization of the tool (30) the opening (20) of the vehicle light is lockable with the closure element (10).

11. The closure system (1) according to claim 10, characterized in that,
the acceptance (11) is shaped for actuation by a tool (30) shaped as an open-end wrench or a hexagon socket wrench.

12. The closure system (1) according to claim 2, characterized in that,
the closure element (10) comprises a revolving sealing element (12).

13. The closure system (1) according to claim 3, characterized in that,
the closure element (10) comprises a revolving sealing element (12).

14. The closure system (1) according to claim 4, characterized in that,
the closure element (10) comprises a revolving sealing element (12).

15. The closure system (1) according to claim 2, characterized in that,
the edge (21) of the opening (20) intends a revolving sealing element (12).

16. The closure system (1) according to claim 3, characterized in that,
the edge (21) of the opening (20) intends a revolving sealing element (12).

17. The closure system (1) according to claim 4, characterized in that,
the edge (21) of the opening (20) intends a revolving sealing element (12).

18. The closure system (1) according to claim 5, characterized in that,
the edge (21) of the opening (20) intends a revolving sealing element (12).

19. The closure system (1) according to claim 6, characterized in that,
through the sealing element (12) the opening (20) is radially and axially sealable.

20. The closure system (1) according to claim 1, wherein the closure element (10) comprises two opposing handles (14), each handle (14) on an opposing side of the closure element (10), and two bayonet lock parts (13, 22), each of the bayonet lock parts (13, 22) assembled on an opposing edge of the closure element (10), such that each of the handles (14) are displaced from each of the bayonet lock parts (13, 22) by about 90° in alternating order.

* * * * *